United States Patent
Braunmiller

(10) Patent No.: US 6,942,722 B2
(45) Date of Patent: Sep. 13, 2005

(54) AIR AND ROOM CLEANING DEVICE

(76) Inventor: Josef Braunmiller, Hauptstrasse 33, 87785 Winterrieden (DE)

( * ) Notice: Subject to any disclaimer, the term of this patent is extended or adjusted under 35 U.S.C. 154(b) by 40 days.

(21) Appl. No.: 10/484,685

(22) PCT Filed: Jul. 26, 2002

(86) PCT No.: PCT/EP02/08366
§ 371 (c)(1),
(2), (4) Date: Jan. 23, 2004

(87) PCT Pub. No.: WO03/011430
PCT Pub. Date: Feb. 13, 2003

(65) Prior Publication Data
US 2004/0255786 A1 Dec. 23, 2004

(30) Foreign Application Priority Data
Jun. 27, 2001 (DE) .................................. 201 12 395 U

(51) Int. Cl.⁷ ............................................ B01D 47/02
(52) U.S. Cl. ........................... 96/333; 96/359; 96/399
(58) Field of Search ........................ 96/244, 333, 351, 96/359, 399; 55/467, 406; 95/226, 270; 261/121.1, 123

(56) References Cited

U.S. PATENT DOCUMENTS

| | | | | |
|---|---|---|---|---|
| 2,102,353 A | | 1/1937 | Brock | |
| 2,213,881 A | * | 9/1940 | Lauer | 96/280 |
| 3,645,070 A | * | 2/1972 | Roe | 96/281 |
| 5,345,649 A | * | 9/1994 | Whitlow | 15/312.1 |
| 5,453,107 A | * | 9/1995 | Liu | 96/344 |
| 5,908,491 A | * | 6/1999 | Hobbs | 95/202 |
| 6,224,656 B1 | * | 5/2001 | Kawamoto | 96/331 |
| 6,379,439 B1 | * | 4/2002 | Shimizu | 96/333 |

FOREIGN PATENT DOCUMENTS

| | | |
|---|---|---|
| GB | 2338174 | 12/1999 |
| JP | 8322770 | 12/1996 |

* cited by examiner

Primary Examiner—Frank M. Lawrence
(74) Attorney, Agent, or Firm—Collard & Roe, P.C.

(57) ABSTRACT

Air and room cleaning device (1, 21) with a suction motor and a supply of water (8), with a rotating separator which is wetted by the water and through which the air flows and with a control unit (17) which brakes the suction motor (15, 23) in particular when the separator (11) is switched off.

16 Claims, 3 Drawing Sheets

AIR AND ROOM CLEANING DEVICE

CROSS REFERENCE TO RELATED APPLICATIONS

Applicant claims priority under 35 U.S.C. §119 of German Application No. 201 12 395.9 filed on Jul. 27, 2001. Applicant also claims priority under 35 U.S.C. §365 of PCT/EP02/08366 filed on Jul. 26, 2002. The international application under PCT article 21(2) was not published in English.

FIELD OF THE INVENTION

The invention relates to an air and room cleaning device with a suction motor and a supply of water as well as with a rotating separator which is wetted by the water and through which the air flows.

BACKGROUND

Devices of this kind have already been disclosed in practice; although they have proved to be very successful, they have a crucial disadvantage.

When the suction motor starts operating and is switched off, air that has either not been cleaned at all or has not been cleaned fully effectively is released, because the separator is not yet or no longer working properly.

SUMMARY OF THE INVENTION

The purpose of the invention is to improve a device of the kind outlined above in such a way that only cleaned air is released when the device is being switched on and off.

In the solution to this problem proposed by the invention, a control unit is provided which brakes the suction motor particularly when or before the separator is switched off.

The suction motor still has a substantial suction capacity when it is slowing down in particular, whereas the separator only has an adequate effect at very high speeds.

When the separator is switched off, the effect of the suction motor is also deactivated to such an extent that it cannot blow out any more uncleaned air.

It has proved to be very advantageous in this context if in accordance with a further development of the invention the suction motor is provided with a brake that takes effect before or at least at the same time that the separator is switched off.

This brake can take different forms.

In an advantageous further development of the invention, a motor independent of the suction motor is provided on the separator.

The suction motor can then be braked already before the separator drive is switched off, so that no suction capacity is available any longer when the effect of the separator decreases.

When the device is switched on, the separator can be started first before the suction motor is activated too.

It has proved to be very advantageous if in accordance with another further development of the invention the control unit switches the suction motor on and off depending on the speed of the separator motor.

It is, however, also possible that the control unit switches the suction motor off before the separator motor and switches the suction motor on after the separator motor.

This chronological order is sufficient to make sure that no uncleaned air is blown through.

It is also very advantageous if in accordance with the invention the separator is pivoted above the supply of water.

In another advantageous further development of the invention, the separator is located at an air passage opening that leads into a suction room in which a ventilation wheel of the suction motor is located.

It is also very advantageous if in accordance with the invention the separator and the ventilation wheel of the suction unit have a joint drive and are provided with a braking unit.

In another advantageous further development of the invention, the separator and the ventilation wheel of the suction motor are located on a joint shaft that is engaged by a brake.

Another further development of the invention is also very advantageous, in accordance with which the brake is configured as an electric brake, such as an eddy current brake.

It is, however, also possible in accordance with the invention that the brake is configured as a mechanical brake.

In accordance with another further development of the invention, it has proved to be very advantageous if at least one guide unit is provided in the area of the supply of water.

This guide unit is designed to direct and guide the path of the contaminated air that flows into the cleaning device.

It has proved to be very advantageous in this context if at least one deflection plate is provided as the guide unit.

It is also very advantageous if the guide unit is provided essentially parallel to the base surface.

In another very advantageous further development of the invention, the guide unit is located in such a way that the supply of water is divided up into at least two chambers.

It has proved to be very advantageous in addition if the guide unit is designed to be removable.

The purpose of all these guide units is to allow the air to spend longer in the supply of water, as a result of which cleaning of the air is improved even more.

BRIEF DESCRIPTION OF THE DRAWINGS

Three embodiments of the invention are shown in the drawings.

Figure 1:
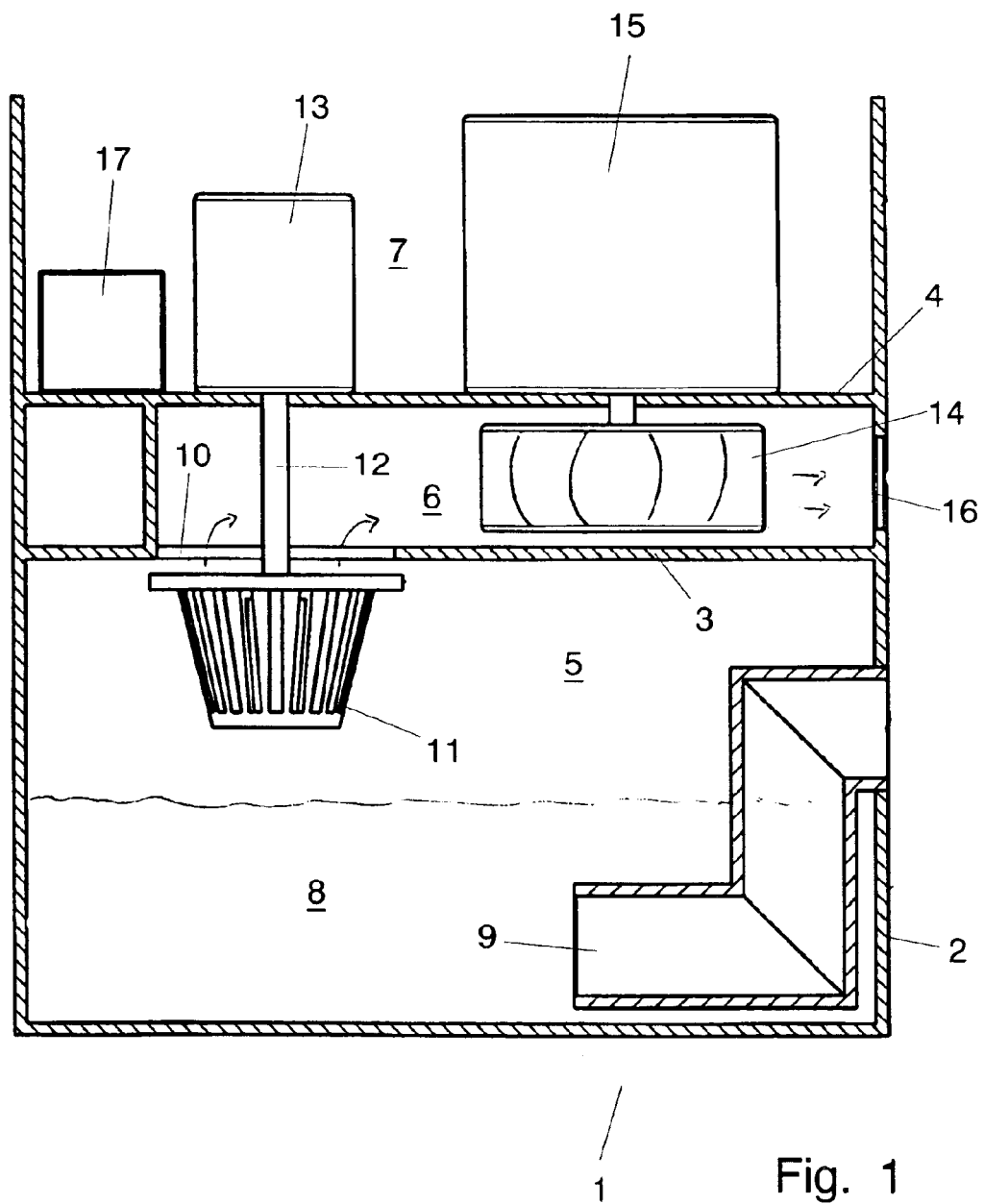
FIG. 1 is a diagram of a device for air and room cleaning with two separate motors.

DETAILED DESCRIPTION OF THE PREFERRED EMBODIMENT 1 in FIG. 1 is a device that has a housing 2. Two horizontal partition walls 3 and 4 are provided in this housing 2 and divide the housing up into three compartments 5, 6 and 7. A supply of water 8, into which an air inlet facility 9 projects, is provided in the bottom compartment 5. This air inlet facility is fitted in the outside wall of the housing 2 above the supply of water 8, so that water cannot escape through the facility. An air passage opening 10, in front of which a separator 11 is located that is connected to a drive motor 13 via a drive shaft 12, is provided in the partition wall 3. The air passage opening 10 leads to the second compartment 6, which is limited by the partition walls 3 and 4. A ventilation wheel 14 of a suction motor 15 is located in this compartment 6, which sucks the air through the air inlet facility 9 and blows it out through an outlet opening 16 in the outside wall of the housing 2.

The flow of air takes drops of water to which the dust particles contained in the air bond with it as it goes through the supply of water. When they meet the separator 11, which is rotating at high speed (about 25 000 rpm), the drops of water with the dust bonded to them is spun off; any water that is not spun off drains downwards, with the dust sticking at least to some extent to the separator.

The air that passes through the separator 11 is cleaned and is transported to the air outlet 16 by the ventilator wheel 14.

When the device 1 is switched on, the separator 11, 12, 13 is first of all started via a control unit 17 that is not explained in any greater detail here; the suction motor 15 is not switched on too until the separator has reached its effective speed. This makes it impossible for uncleaned air to escape via the air outlet 16. The separator remains switched on as long as the ventilation wheel 14 of the suction motor 15 is still transporting air out of the outlet when the device is switched off as well. The separator motor 13 is not switched off by the control unit 17 until after this.

Figure 2:
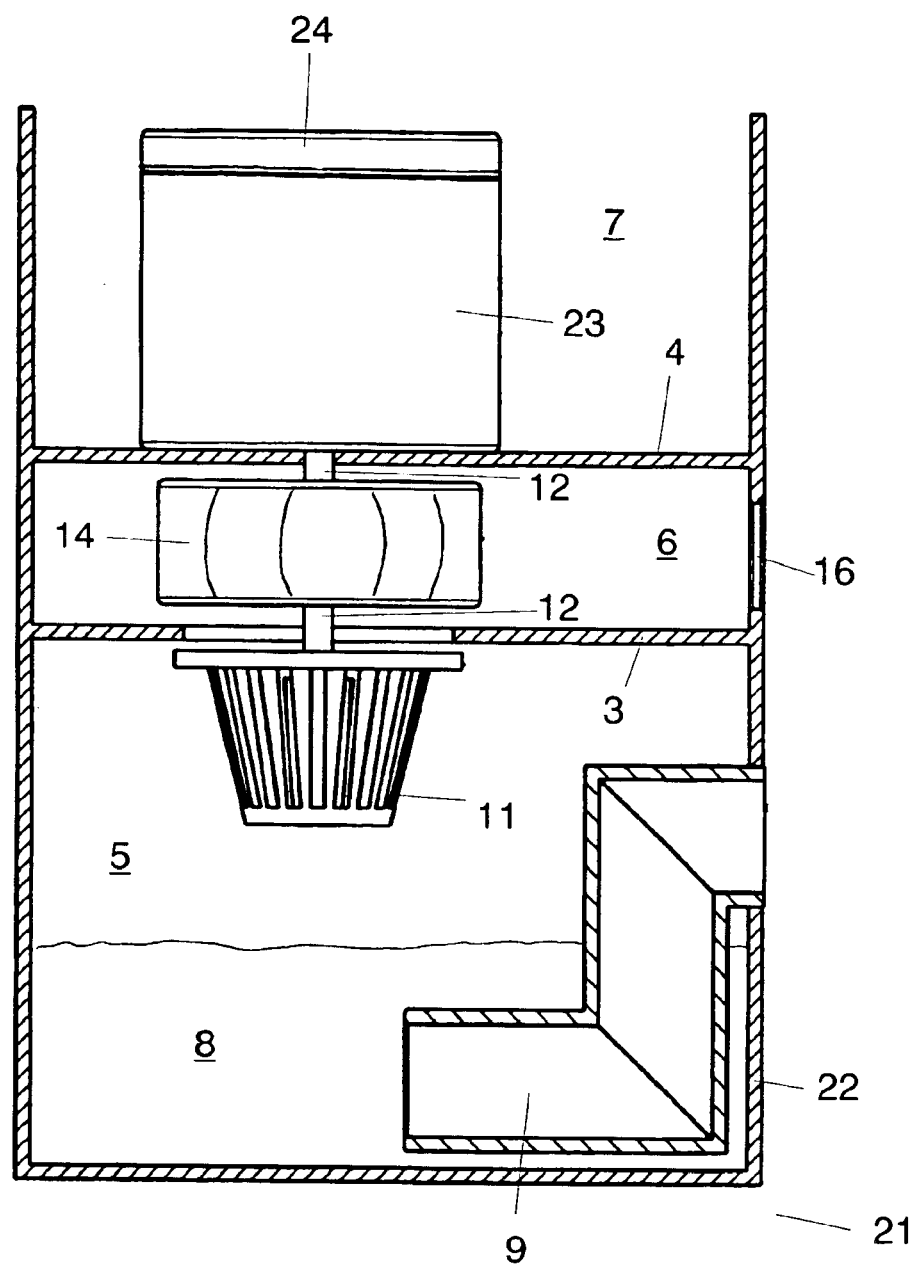
FIG. 2 is another diagram of a device with a joint drive motor for the suction unit and the separator and FIG. 3 is a further diagram of a device for air and room cleaning with a guide unit designed in the form of a deflection plate.
Figure 3:
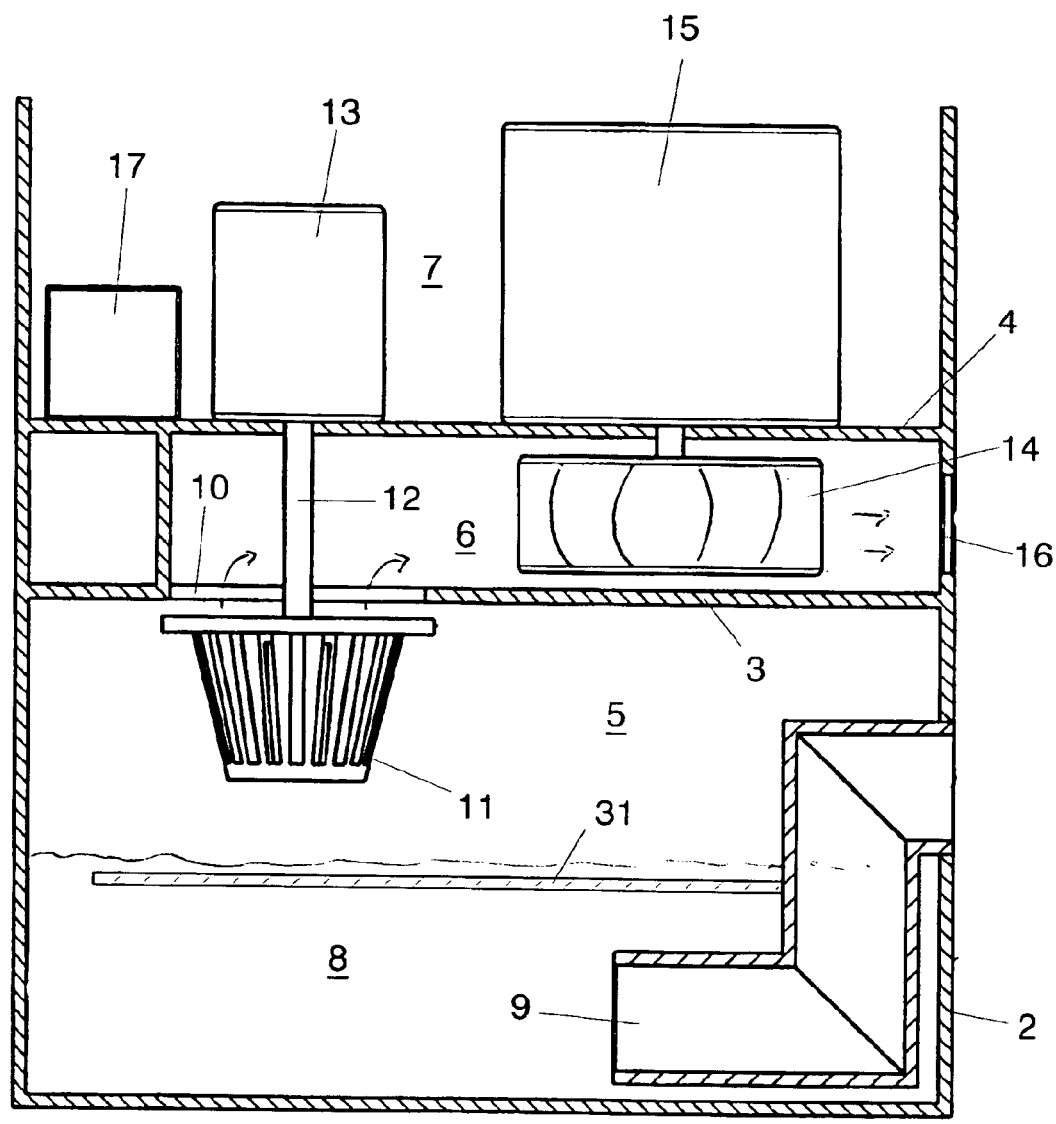

An air and room cleaning device 21 is again provided with a housing 22 in the embodiment illustrated in FIG. 2. The two partition walls 3 and 4 separate three compartments 5, 6 and 7 from each other here too. A supply of water 8, into which the air inlet facility 9 projects, is again provided in the bottom compartment 5. The separator 11 located in the bottom compartment 5 above the supply of water 8 and the ventilation wheel 14 located in the second compartment 6 are attached to a joint shaft 12, that is driven by a joint drive motor 23.

This drive motor 23 is designed in such a way that it reaches its maximum speed at which the separator 11 operates fully effectively very quickly, so that no significant amount of uncleaned air escapes when the device 21 starts to run.

The drive motor 23 is equipped with a brake 24 that leads to a very fast stop when the device is switched off, so that no significant amount of air is transported any more in this case either.

Different configurations are possible for the brake 24. An electric brake such as an eddy current brake is one conceivable alternative. Electronic brake circuits can also be used. It is, however, possible to provide a mechanical brake as well.

The separator 11 and the ventilation wheel 14 can be connected to each other by other means instead, for example via a belt drive, and can then be driven by a single motor. The same measures outlined in connection with the joint drive shaft are then necessary in this context.

A horizontal deflection plate 31, which increases the length of the time the air sucked in through the air passage opening 10 spends in the supply of water 8, can be provided in the area of the supply of water. It is, however, also conceivable that the path the air takes through the supply of water 8 is extended even more by providing appropriately shaped guide units. A channel can, for example, be formed through the supply of water 8. The deflection plate 31 is designed to be removable. Easy cleanability is therefore guaranteed.

It is, however, also conceivable that the compartment 5, which contains the supply of water 8, is divided up into at least two sub-compartments above the supply of water 8 by a guide unit and that the air intake facility 9 is only configured to breach the outside wall of the housing 2. The air inlet facility projects into one of the two sub-compartments inside the device. Air has to flow through the supply of water 8 to reach the other sub-compartment from this sub-compartment.

What is claimed is:

1. Air and room cleaning device (1, 21) with a suction motor and a supply of water (8) as well as with a rotating separator which is wetted by the water and through which the air flows, wherein a control unit (17) is provided which brakes the suction motor (15, 23) particularly when the separator (11) is switched off.

2. Air and room cleaning device according to claim 1, wherein the suction motor (23) is provided with a brake (24) that takes effect before or at least at the same time that the separator (11) is switched off.

3. Air and room cleaning device according to claim 1, wherein a motor (13) independent of the suction motor (15) is provided on the separator (11).

4. Air and room cleaning device according to claim 3, wherein the control unit (17) switches the suction motor (15) on and off depending on the speed of the separator motor (13).

5. Air and room cleaning device according to claim 3, wherein the control unit (17) switches the suction motor (15) off before the separator motor and switches the suction motor (15) on after the separator motor.

6. Air and room cleaning device according to claim 1, wherein the separator (11) is pivoted above the supply of water (8).

7. Air and room cleaning device according to claim 6, wherein the separator (11) is located at an air passage opening (10) that leads into a suction room (6) in which a ventilation wheel (14) of the suction motor (15) is located.

8. Air and room cleaning device according to claim 1, wherein the separator (11) and the ventilation wheel (14) of the suction unit have a joint drive.

9. Air and room cleaning device according to claim 8, wherein the separator (11) and the ventilation wheel (14) of the suction motor are located on a joint shaft (12) that is engaged by a brake (24).

10. Air and room cleaning device according to claim 9, wherein the brake (24) is configured as an electric brake, such as an eddy current brake.

11. Air and room cleaning device according to claim 9, wherein the brake (24) is configured as a mechanical brake.

12. Air and room cleaning device according to claim 1, wherein at least one guide unit is provided in the area of the supply of water (8).

13. Air and room cleaning device according to claim 12, wherein at least one deflection plate (31) is provided as the guide unit.

14. Air and room cleaning device according to claim 12, wherein the guide unit is provided essentially parallel to the base surface.

15. Air and room cleaning device according to claim 12, wherein the guide unit is located in such a way that the supply of water (8) is divided up into at least two chambers.

16. Air and room cleaning device according to claim 12, wherein the guide unit is designed to be removable.

* * * * *

UNITED STATES PATENT AND TRADEMARK OFFICE
CERTIFICATE OF CORRECTION

PATENT NO.     : 6,942,722 B2
DATED          : September 13, 2005
INVENTOR(S)    : Braunmiller It is certified that error appears in the above-identified patent and that said Letters Patent is hereby corrected as shown below:

Title page,
Item [30], Foreign Application Priority Data, please correct the date from "Jun. 27, 2001" to -- July 27, 2001 --.

Signed and Sealed this

Eighth Day of November, 2005

JON W. DUDAS
*Director of the United States Patent and Trademark Office*